(12) United States Patent
Schukovets et al.

(10) Patent No.: US 9,930,113 B2
(45) Date of Patent: Mar. 27, 2018

(54) DATA RETRIEVAL VIA A TELECOMMUNICATION NETWORK

(71) Applicant: SAP SE, Walldorf (DE)

(72) Inventors: Igor Schukovets, Mannheim (DE);
Gregor Tielsch, Mannheim (DE);
Christian Conradi, Walldorf (DE);
Stephan Guentert, Heidelberg (DE);
Bernd Kauerauf, Heidelberg (DE);
Nils Hartmann, Heidelberg (DE);
Marcel Hermanns, Heidelberg (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 14/470,964

(22) Filed: Aug. 28, 2014

(65) Prior Publication Data

US 2016/0063107 A1    Mar. 3, 2016

(51) Int. Cl.
*H04L 29/08* (2006.01)
*G06F 17/30* (2006.01)

(52) U.S. Cl.
CPC ...... *H04L 67/1097* (2013.01); *G06F 17/3056* (2013.01)

(58) Field of Classification Search
CPC .................... H04L 67/1097; G06F 17/3056
USPC ......................................................... 707/770
See application file for complete search history.

(56) References Cited

U.S. PATENT DOCUMENTS

| 5,737,592 A | 4/1998 | Minh et al. | |
| 2002/0049695 A1* | 4/2002 | Gallery | G06F 12/12 |
| 2009/0327324 A1* | 12/2009 | Laflen | G06F 17/30312 |
| 2010/0299367 A1* | 11/2010 | Chakrabarti | G06F 17/3053 707/803 |
| 2012/0117509 A1* | 5/2012 | Powell | G06F 17/30528 715/786 |
| 2012/0330924 A1* | 12/2012 | Rajan | G06F 17/30463 707/714 |
| 2014/0208063 A1* | 7/2014 | Ruggiero | G06F 17/30312 711/206 |
| 2015/0012526 A1* | 1/2015 | Zedlitz | G06F 17/30554 707/722 |

OTHER PUBLICATIONS

Mindmatrix: "View (SQL)", Aug. 21, 2014, pp. 1-3, XP055255137, https://en.wikipedia.org/w/index.php?title=View_(SQL)&oldid=622197558.

(Continued)

*Primary Examiner* — Ashish K Thomas
*Assistant Examiner* — Dustin Eyers
(74) *Attorney, Agent, or Firm* — Harness, Dickey & Pierce, P.L.C.

(57) ABSTRACT

A method includes supplementing a database with multiple database views respectively representing a data model and including a first column representing a first attribute of the data model and a second column representing a second attribute of the data model; identifying a database view capable of retrieving requested data; retrieving instances of the data model represented by the identified view via the network using a first select criterion directed at the first column and a second select criterion directed at the second column of said view, the second attribute values of the data model instances being calculated selectively for instances having been dynamically identified by the first select criterion; and returning a result via the network.

15 Claims, 6 Drawing Sheets

(56) References Cited

OTHER PUBLICATIONS

Wikibooks, "MySQL/Language/Queries", http://en.wikibooks.org/w/index.php?title=MySQL/Language/Queries&oldid=2546919, Jan. 1, 2013, pp. 5-6.
Heuer et al., "Database access in mobile environments", Lecture Notes in Computer Science, Jan. 1, 1996, pp. 5-6.
EPO, Partial European Search Report, EP 14182687.5, dated Apr. 8, 2015.
Suering et al., "PHP, MySQL, JavaScript & HTML5 All-in-One for Dummies", ISBN: 978-1-118-22874-6, Jan. 1, 2013, pp. 10-12.
Pelzer, Trudy, "MySQL 5.0 Views MySQL 5.0 New Features Series—Part 3 A MySQL Technical White Paper Table of Contents", www.newcommerce.ca/confphp/mysql-views.pdf , Mar. 1, 2005, pp. 1-42.
Atkinson, Leon, "Core PHP Programming Using PHP to Build Dynamic Web Sites", ISBN: 0-13-089398-6, Aug. 3, 2000, p. 26.

\* cited by examiner

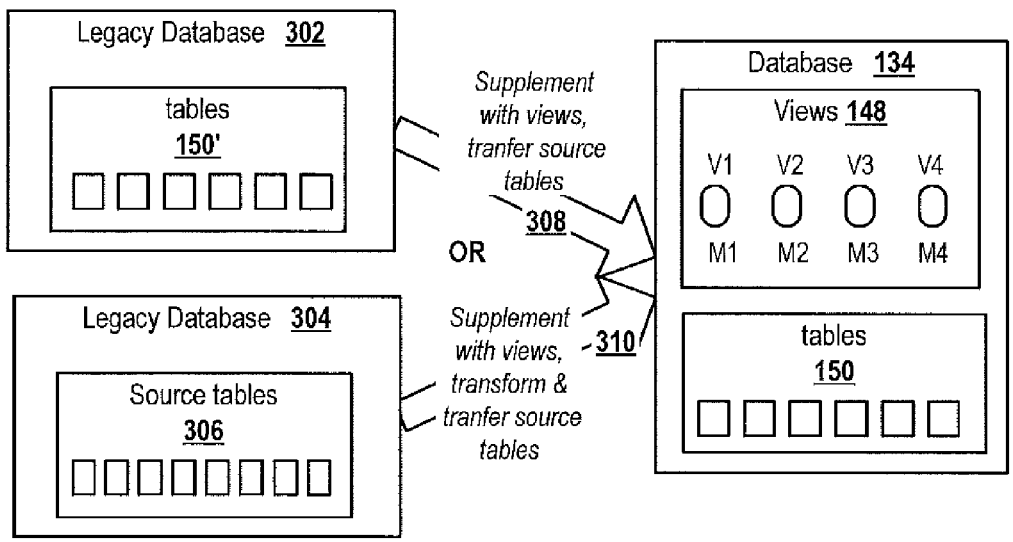
FIG. 3
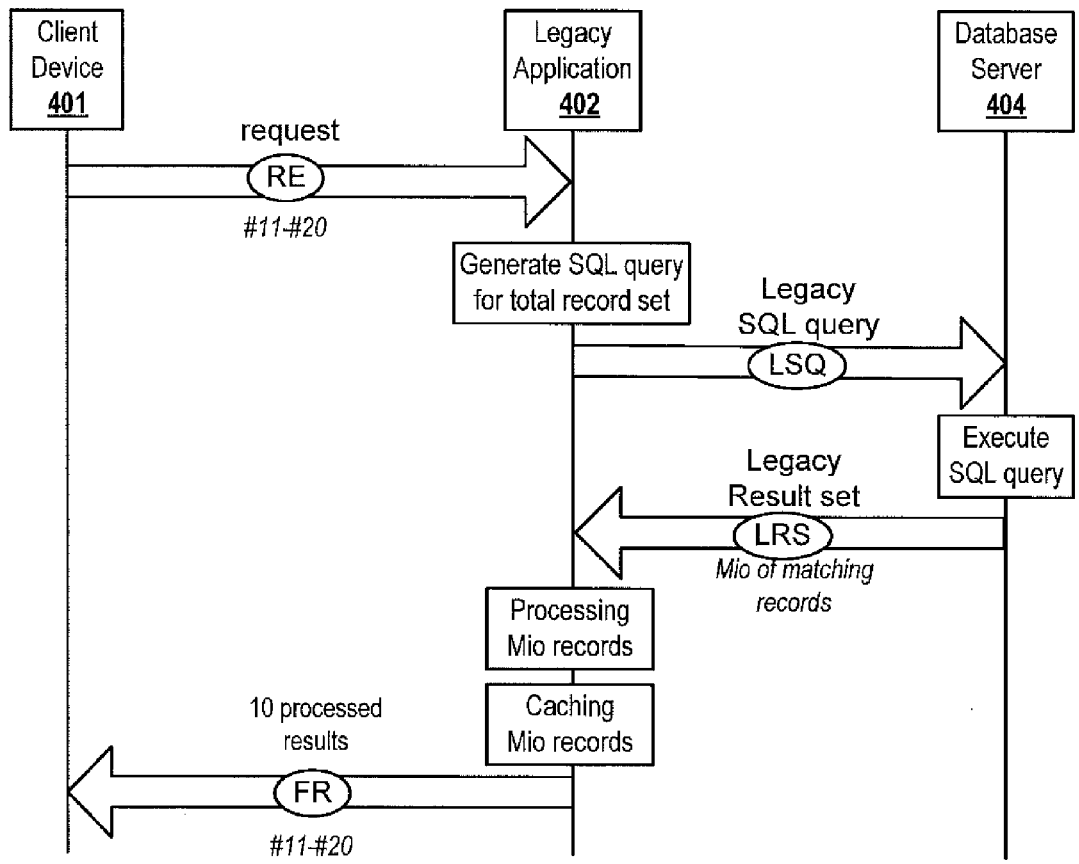
FIG. 4  PRIOR ART DATA RETRIEVAL SYSTEM

DATA RETRIEVAL VIA A TELECOMMUNICATION NETWORK

BACKGROUND OF THE DISCLOSURE

Field of the Disclosure

The invention relates to data retrieval method to be executed in a telecommunication network, the method preventing a sender device from becoming a data traffic bottleneck.

Description of the Related Art

Many large legacy applications that are still in use today were built several decades ago. An enormous amount of time and money was meanwhile invested to optimize the data processing workflow of said applications for the needs of the owning company. Often, legacy applications have become so complex that it is almost impossible to substitute them by other solutions which might be able to execute at least some of the data processing tasks more quickly. Also, the complete replacement of legacy business applications would result in a loss of many decades of experience and know-how that was integrated in said software suites.

Some limitations of such legacy applications in respect to response time and data traffic were considered acceptable decades ago when the systems were built. Today, however, mobile telecommunication devices such as smartphones are ubiquitously used and thousands of smart phones may try to request data from legacy applications concurrently. Also, the users nowadays expect the requested data to be delivered in real time. This leads to increased demands in respect to the response time and efficiency of legacy applications having been requested by the mobile telecommunication devices to retrieve some data. Sometimes, a cloud service infrastructure serving thousands of mobile telecommunication devices concurrently is used, but such infrastructures require a much more efficient use of the available resources, in particular in respect to memory, CPU and network bandwidth consumption of applications hosted by a cloud-server. These requirements may not be fulfilled by many legacy applications, but a complete substitution of legacy application may also not be an option for the above given reasons.

SUMMARY OF THE PRESENT DISCLOSURE

It is an objective of the present invention to provide for an improved data retrieval method and telecommunication system as specified in the independent claims. Embodiments of the invention are given in the dependent claims. Embodiments of the present invention can be freely combined with each other if they are not mutually exclusive.

In one aspect, the invention relates to a method for efficient data retrieval via a telecommunication network. The network interoperatively couples a mobile telecommunication device with a sender device. The sender device hosts an application and is interoperably coupled via the telecommunication network to a database management system ("DBMS"). The DBMS hosts a database. The data retrieval method comprises:

supplementing the database with multiple database views respectively representing a data model, wherein each database view is configured for retrieving instances of the data model represented by said database view from at least one table of the database upon being called, wherein each of the multiple database views comprises a first column and a second column, the first column representing a first attribute of the data model represented by said database view, the second column representing a second attribute of the data model represented by said database view;

providing an adapter module hosted by the sender device;

receiving, by the adapter module, a data retrieval request from the application, whereby at the moment of receipt, the first column of each of the multiple database views has already assigned first attribute values for the first attribute represented by said first column and each second column has assigned a routine for dynamically calculating second attribute values for the second attribute represented by said second column;

evaluating, by the adapter module, the data retrieval request for identifying at least one of the multiple database views that is capable of retrieving, upon being called, data specified in the data retrieval request;

calling, by the adapter module, the identified at least one database view with a single SQL query, thereby retrieving instances of the data model represented by the identified at least one database view, the instances being retrieved via the telecommunication network, the single SQL query comprising a first select criterion directed at the first column of said at least one identified database view and a second select criterion directed at the second column of said at least one identified database view wherein the retrieving of the data model instances comprises calculating the second attribute values selectively for data model instances having been dynamically identified by means of the first select criterion;

forwarding, by the adapter module, the retrieved instances to the application via the telecommunication network; and receiving and processing, by the application, the forwarded instances of the identified data model and returning a result of said processing to the mobile telecommunication device via the telecommunication network.

Said features may be advantageous, because the data retrieval process may be significantly accelerated and response times may be reduced: instead of calculating the second attribute values for all data records available, at first the first select criteria are evaluated on already existing data to create a first set of data model instances that is typically a sub-set of the total number of available data model instances. The second attribute values are calculated selectively for said first set of data model instances, thereby reducing the response time of the database server and thus also the response time of the sender device.

In a further beneficial aspect, the calculation of attribute values which are not available in the database when the request is received may be very fast, because said calculation is 'pushed down' from the application layer to the database layer, thereby freeing memory and CPU resources of the sender device.

The above described data retrieval method may be particularly advantageous in a scenario where many thousand mobile telecommunication devices concurrently request data from the application running on the sender device. In such a scenario, the sender device and its limited CPU and memory capacity may easily become the bottleneck of data retrieval. Said situation may be avoided by reducing the number of attribute values calculated dynamically and by delegating said calculation to the database or remote servers hosting database-external program routines for calculating the second attribute values.

The provision of database views representing data models may not only increase performance but may also ease the creation and maintenance of SQL queries adapted to retrieve attributes of a particular data model: database views may hide the complexity of the database operations that are performed when a database view is called. As the database views are not called directly by the application but rather via an adapter module, memory consumption on the sender device is further reduced because the logic for the query creation and database view identification may be provided and instantiated only once: according to some embodiments, multiple applications hosted by the sender device may be configured to retrieve data from the database in the above described manner via a single central instance of the adapter module.

In a further beneficial aspect, providing the database views and the adapter module configured for generating data model-based database queries may allow owners of legacy application to keep most of the program logic of a legacy application unaltered. The adapter module may merely be responsible for query generation and data retrieval from the database layer to make better use of the performance improvements provided by the database and/or by the database view-based data retrieval. The adapter module may not affect or alter the core processing logic of the application. Thus, the features may allow retrieving data from a database via a (legacy) application in a much faster manner without having to replace the whole application logic.

In some embodiments, each retrieved data model instance comprises one of the first attribute values and one of the second attribute values. A data model may comprise multiple first attributes and multiple second attributes. Each of said multiple first attributes may be represented by a respective first column of the database view representing said data model and each of said multiple second attributes may be represented by a respective second column of said database view.

According to embodiments, the retrieving of the data model instances comprises:
  evaluating, by the DBMS, the first select criterion on the first attribute values assigned to the first column of the at least one identified database view for selecting a first set of the instances of the data model represented by the at least one identified database view; and
  calculating, by the DBMS, the second attribute values selectively for the instances of the first set of instances by executing the routine assigned to the second column at which the second select criterion is directed; and
  selecting, by the DBMS, a resulting set of instances of the data model represented by the at least one identified database view by evaluating the second select criterion selectively on the calculated second attribute values; in most of the cases, the resulting set will be a sub-set of the first set of instances;
  returning, by the DBMS, the resulting set to the adapter module via the telecommunication network.

This may be advantageous, because the costly calculation of the second attribute values may only be performed for a subset of data model instances. Thus, instead of calculating and evaluating all data records and transferring millions of matching data records to the sender device over night or at least in the time frame of several minutes or hours, the data retrieval may be accelerated by evaluating at first only select criteria which operate on data that is already stored in the database. While in prior art approaches the calculation of dynamically calculated parameter values was so costly that the totality of matching data records was retrieved (e.g. over night or as a background process of many minutes or hours) and cached in the sender device, embodiments of the invention may allow for individually retrieving sub-sets of the totality of matching data records and thus may help reducing memory consumption by the sender device.

According to embodiments, the received request comprises pagination information. The pagination information is indicative of a start position and an offset of a list of the instances of the data model represented by the at least one identified database view. The generation of the single SQL query comprises the adapter module transforming the pagination information into an OFFSET and a LIMIT SQL clause and including the OFFSET and LIMIT clause in the single SQL query. The selection of the instances by means of the first and second select criteria comprises selectively selecting data model instances whose position within a complete result set of instances matching the first and second select criterion is larger than the position specified in the OFFSET clause and smaller than the position specified in the LIMIT clause. The 'complete result set' is the set of data model instances that would be retrieved by the single SQL query solely based on the evaluation of the first and second select criteria on the attribute values of said instances. Thus, a complete result set is not limited by any OFFSET or LIMIT clause.

Creating and executing single SQL queries that respectively comprise the start position and offset information in combination with the efficient database view based data retrieval may be advantageous, because the user of the telecommunication device may be enabled to navigate between pages respectively comprising different subsets of the matching data model instances. Each single query may retrieve only the data specified by the LIMIT and OFFSET clause. Thus, the data traffic between the database server and the sender device may be reduced, less data needs to be kept in the memory of the sender device and the overall data retrieval process may be accelerated.

According to some embodiments, the user may specify the pagination information manually via some GUI elements shown on the display of the mobile telecommunication device. According to some other embodiments, the pagination information is specified by the application. According to some further embodiments, the mobile telecommunication device dynamically and automatically specifies the number of the requested data model instances to be displayed in a single page via a display of the mobile telecommunication device. According to some embodiments, this may be achieved by the mobile telecommunication device evaluating the network bandwidth of the telecommunication network connecting the mobile telecommunication device with the sender device. The higher the network bandwidth, the higher the specified number of the instances.

In addition, or alternatively, the dynamic specification of the number of requested instances may be achieved by the mobile telecommunication device determining its display size. The larger the display size, the higher the specified number of the instances. For example, the display size may be determined by an application running on the mobile telecommunication device that evaluates the device type of the mobile telecommunication device and thus determines the size and resolution of the display. The mobile telecommunication device may use the specified number of instances to be displayed and include said number as part of the pagination information in the request submitted to the adapter module. The specified number is transformed by the adapter module into the LIMIT clause.

This may be advantageous because the amount of the requested data is automatically adapted and optimized for the currently available network traffic and/or display size. Thus, in case the display is only small or in case the low bandwidth of the network would lead to long response times, the number of requested data items may be dynamically and fully automatically reduced, thereby preventing situations where relevant data is hidden from the user due to an overloaded GUI and/or where the user has to wait for minutes until a page with the requested data items can be rendered.

According to embodiments, the sender device, immediately upon having forwarded the retrieved and processed data model instances by the application, the sender device frees the main memory having been occupied by the retrieved and processed data model instances. In addition, in case the retrieved instances are also stored to a non-volatile storage of the sender device, the storage space of said non-volatile storage may also be freed.

This may be advantageous, because less memory and/or storage is consumed for caching the retrieved data items on the sender device. In some state of the art approaches, data retrieval was so costly that all matching data records were transferred from the database to the sender device in response to a query for only some few records and were cached in the memory of the sender device. The identification and transfer of said records could take minutes or even hours. By using efficient, database view based data retrieval and by freeing the memory space of the sender device immediately upon returning the requested data to the requesting mobile telecommunication device, memory and storage capacity of the sender device is saved. As a result, the sender device may be able to retrieve data for many thousand mobile telecommunication devices concurrently.

According to embodiments, the method further comprises automatically transferring data stored in a source database, e.g. a legacy database, to one or more of the tables of the above mentioned database. The transferred data comprise the first attribute values. The automated transfer may be executed, for example, by means of a script or an application configured for copying or moving data from one database (source database) to another database (target database). The target database may be managed, for example, by a more efficient DBMS. In addition or alternatively, the structure of the tables of the target database in which the transferred data may be stored may be speed optimized for a more efficient data retrieval.

According to some embodiments, the source database is managed by a conventional, disc-based DBMS such as PostgreSQL or MySQL. The target database may be an in-memory database such as, for example, SAP HANA. This may allow increasing performance of data retrieval, because data is held in memory and does not have to be read from a storage disk. In addition, additional features of the in-memory database related to increased ability for parallelizing processing tasks may speed up data retrieval.

According to some embodiments, at least one of the first columns is organized as a column store wherein each first attribute value is mapped to one or more record identifiers. The first column may comprise millions of lines. The evaluation of the first select criterion on the first attribute values of said first column may comprise distributing subsets of said first attribute values to multiple processing unit and evaluating the first select criterion on each of said sub-sets in parallel. Finally, the results obtained from said parallel evaluation may be recombined for returning the first set of instances. Said parallel processing of the evaluation of the first select criterion, which may also be used for performing a fuzzy text search quickly, may already come with the new in-memory DBMS. Thus, the execution of said tasks may be pushed from the application layer to the database layer, thereby increasing the performance of data retrieval.

The automated transfer of data from the source database to the target database may be executed, for example, by a script or a refactoring module that may have some additional functions such as refactoring legacy application for enabling the refactored legacy application to efficiently retrieve data from the target database via the adapter module that is capable to make use of database views and corresponding data models for efficiently retrieving data from a database.

According to embodiments, the first attribute values of the first attribute of one of the data models are originally stored in a source column of a table of a source database. The source database may be, for example, be a legacy database. The supplementing of the database with the multiple database views comprises mapping a column name of said source column to one of the first columns that shall represent said first attribute. The method further comprises: automatically transferring the first attribute values form the source column to a target column contained in the at least one table; automatically assigning the target column having received the transferred first attribute values to the first column that is assigned by the mapping to the source column originally comprising said first attribute values, thereby automatically creating the assignment of the first column to the first attribute values and automatically linking the first attribute represented by said first column to the transferred first attribute values.

This may be advantageous, because the linking of the transferred data and tables to database views representing a data model may enable the adapter module to extract data from said transferred table in a data model driven manner without having to significantly modify the adapter module. The adapter module may comprise or be operatively coupled to a mapping of attribute names of data models to column names of the database views representing a data model. Thus, after minor changes, e.g. an update in the mapping for including the column names of a new database view, any transferred data linked to the columns of the new database view may easily be retrieved by the adapter module in a data model-driven manner. The mapping column names of the source database to one or more of the first columns of one or more of said database views may assigning the transferred data and the first attribute values contained therein to attributes of one of the data models represented by said one or more database views.

According to embodiments, the first attribute values are stored in the source database in one or more source tables. The structure of the tables to which the first attribute values are transferred may be identical to the structure of source tables. In other embodiments, the structure of the tables of the target database may differ from the structure of the tables of the source database to increase performance. For example, the distribution of columns to different tables may vary, or the target database may be a column-store database while the source database is a row-oriented relational database.

According to embodiments, the source database is a legacy database. Transferring the data contained in a legacy database automatically to a new, more efficient database and supplementing the new database with database views may be advantageous, because said amendments which may be executed largely automatically may suffice for enabling any legacy application to make use, via the adapter module, of the efficient database view based data retrieval routines. In addition, supplementing a database with some additional database views may be achieve much more efficiently than rewriting the complete database access and processing logic of the legacy application.

According to embodiments, the generation of the single SQL query by the adapter module comprises transforming the data retrieval request and one or more parameters contained in said request into the single SQL query. The single SQL query comprises, in any combination, one or more of: a search phrase, a sort criterion, the first and second select criterion, and a grouping criterion. For example, the adapter module may act as a kind of translator of the request to the new data models and respective database views. Thus, any parameter that may be specified by the mobile telecommunication device or its user may be automatically translated into a respective clause or criterion of the single SQL query. Thus, the database and not the application layer may be responsible for retrieving only the data actually requested by the mobile telecommunication device, whereby the data may be already provided in a sorted and aggregated manner. This may reduce CPU load on the sender device.

According to embodiments the at least one identified database view comprises multiple first columns and multiple second columns. The single SQL query comprises multiple first select criteria and multiple second select criteria. Each of the first select criteria is evaluated on first attribute values assigned to the one of the first columns at which said first select criteria is directed for selecting the first set. All second select criteria are evaluated on said calculated second attribute values for selecting the data model instances. Each of the retrieved data model instances comprises a first attribute value for each of the first attributes of said data model and comprises a calculated second attribute value for each of the second attributes one of said data model.

According to embodiments, the at least one table is one of a plurality of tables of the database. Each of the multiple database views respectively representing a data model is a root element of a hierarchy of interconnected elements. The elements of each of said hierarchies comprise at least one further database views and comprise at least one of the plurality of tables. Said at least one further database view and said at least one table are interconnected to each other via primary and secondary database keys. The topology of the hierarchy and the columns of the interconnected at least one database view and the at least one table determines how the instances of the data model represented by said database view being the root element of said hierarchy are retrieved.

The calling of each of the of the multiple database views respectively representing a data model by a single SQL query comprises calling all the further database views contained in said root element's hierarchy in a cascaded manner in accordance with the topology of the hierarchy. Each of said called further database views comprises SQL statements for joining one or more of the database tables being elements of said hierarchy. Thereby, all first attribute values of a requested data model may be retrieved for assembling the instances of said data model.

For example, the topology of said hierarchy may be specified in the form of database joins being part of the database views in said hierarchy and the database keys which may be used as join conditions of said joins. Said features may be advantageous, because highly complex data retrieval and aggregation functions configured for processing data having been derived from a plurality of tables may be triggered by a comparatively simply structured single SQL query.

According to embodiments, each first column of each of the multiple database views respectively representing a data model is assigned via a mapping to a respective column of the at least one table of the database. In addition, or alternatively, at least a first one of the routines assigned to one of the second columns is an SQL statement and wherein at least a second one of the routines assigned to another one of the routines is part of a database-external program logic. Said database-external program logic may be specified, for example, in a non-SQL based, procedural or object oriented programming language. For example, said second one of the routines may be part of a database-external application written, for example, in ABAP, Java, C++ or C#. A call to the second column of a database view having assigned said second routine may trigger the execution of said database-external application that may calculate the second attribute values. This may be advantageous, because the processing load of the sender device may be reduced by executing the attribute value calculation not in the application hosted by the sender device but rather by the database server executing the SQL based routines or another remote server hosting the database-external routines.

According to embodiments, the evaluation of each first select criterion comprises performing an index-based search on the first attribute values assigned to the first column at which said first select criterion is directed. For example, each first column may have an index. Each first column may be configured for solely storing attribute values of a particular data type, e.g. INTEGER, VARCHAR, LONG or BOOLEAN. This may increase performance because an index based search on already existing attribute values may be executed within milliseconds also for thousands of data records.

According to embodiments, the execution of the routine assigned to the second column comprises retrieving the second attribute value from an external data source, e.g. from another database, a flat file, a remote computer, a cloud service, etc. The external data source may be a mere data container, e.g. a database, or an executable program logic configured for dynamically calculating the second attribute values. In addition or alternatively, the execution of said routine comprises reading and processing one or more input data values from two or more different tables of the database. The processing of the input data values may comprise, for example, aggregating, combining, concatenating and/or multiplying the input data values.

According to embodiments, the adapter module comprises or is coupled to an OData-service module. The data retrieval request is an OData request. The generation of the single SQL query comprises transforming the OData service request by the OData-service module into the single database request. This may be advantageous, because the OData-standard supports many different protocols. For example, the request of the mobile telecommunication device may be a HTTP request, a SOAP request, etc. Thus, the adapter module may be able to flexibly process a broad spectrum of request protocols of different kinds of telecommunication devices.

According to embodiments, the method further comprises storing the first set of data model instances in one or more columns of a temporary database table of the database before the second attribute values are calculated. Said temporary database table comprises further columns acting as containers for storing the second attribute values to be calculated dynamically. The method further comprises freeing, by the DBMS, the main memory that was occupied by the temporary database table after the retrieved data model instances were returned to the adapter module. Preferentially, the temporary database table is a mere data container that may not have assigned a routine.

According to alternative embodiments, the calculation of the second attribute values is implemented in the form of sub-queries being part of a main SQL query that constitutes the database view called by the single SQL query.

According to embodiments, the first attribute value represented by the first column of the at least one identified database view is of a TEXT data type and wherein the first select criterion comprises a search phrase. For example, the search phrase may consist of a single word or multiple words. The evaluation of the first select criterion on the first attribute values comprises evaluating the search phrase on the first attribute value by performing a text search and including only those data model instances in the first set whose first attribute values match the search phrase. Preferentially, the search phrase may be specified by a user of the mobile telecommunication device via a user interface, e.g. a GUI. For example, a user may enter a first select criterion via a user interface. Said first select criterion may be part of the data retrieval request and may constitute the search phrase.

The combination of a text search and the calculation of the second attribute values selectively for data model instances whose first attribute value text matches a first select criterion may be advantageous, because a great flexibility is provided to the user of the telecommunication device: the user may dynamically specify for what kind of data the second attribute values should be calculated. Thus, the user does not have to retrieve data instances based on predefined search criterion which might not exactly match the user's interest. Thus, the amount of data records actually retrieved and processed may further be reduced and CPU and memory resources of the sender device may be saved.

According to embodiments, the method further comprises generating, by the application, one or more fuzzy search phrases. The adapter module uses the one or more fuzzy search phrases for executing the text search. The generation of the one or more fuzzy search phrases comprises stemming the search phrase for generating the fuzzy search phrase or generating a set of derivative search phrases to be used as the one or more fuzzy search phrases. The adapter module uses the generated set of search phrases for performing the text search. The set of derivative search phrases comprises one or more of: synonyms of the search phrase, spelling variants of the search phrase, lower-case and larger-case variants of the search phrase, typing-error-corrected versions of the search phrase, and acronyms or long forms of the search phrase. Using fuzzy search phrases may help reducing the risk of overseeing relevant data due to typing errors, synonym usage or spelling variants of various kinds.

According to embodiments, the method further comprises generating, by the database management system, two or more indices for each further column of the temporary database table. Each of said two or more indices is adapted to be searched by different types of fuzzy search phrases. This may help accelerating the fuzzy search.

According to embodiments, the method further comprises executing a refactoring module. The refactoring module analyzes a log of a legacy application and the source code of the legacy application. The log may consist, for example, of one or more trace files. A trace file is a report file that contains information about application functioning when and already before an error appears. The refactoring module uses the result of said analysis for automatically replacing at least one legacy code section of the legacy application by a new code section, thereby creating the application. The at least one replaced legacy code section comprises data retrieval statements acting directly on tables of the legacy database for retrieving the first attribute values. The new code section comprises a specification of a call to the adapter module for triggering the adapter module to create the single SQL query. The single SQL query is configured for retrieving at least one of said first attribute values by calling one of the multiple database views that comprises a first column having assigned said first attribute values. This may allow for an automated or semi-automated refactoring of legacy applications: at the one hand, valuable know how and experience having been incorporated in the code of the legacy application over the past decades may be preserved. On the other hand, the data retrieval may be accelerated by replacing the legacy data access logic by a logic enabling the legacy application to interact with the adapter module for retrieving data via database views and database view-based data models.

According to embodiments, the log is descriptive of legacy SQL queries directed at a legacy database. The legacy database comprises the first attribute values in one or more source tables and lacks the multiple database views representing the data models. Legacy SQL queries contained in the log comprise column names of columns of the source tables of the legacy database.

According to embodiments, the using of the result of the log analysis for automatically replacing the at least one legacy code section comprises:
  selecting, by the refactoring module, one of the column names comprised in the log;
  identifying, by the refactoring module, at least one legacy code section which directly accesses one of the source tables of the legacy database via said selected column name;
  evaluating, by the refactoring module, a mapping, the mapping comprising an assignment of the column names contained in the log with the first attributes of the data models, the evaluation being executed for identifying one of the first attributes mapped to the selected column name.

The new code section is configured to call the adapter module for causing the adapter module to generate a single SQL query configured to call the one of the database views that represents the data model comprising the first attribute having been identified by evaluating the mapping.

According to embodiments, the log is descriptive of legacy procedures of the legacy application, the legacy procedures having been executed for calculating parameter values of multiple parameters. The parameter values are absent from (i.e., not stored in) the legacy database. The using of the result of the log analysis for automatically replacing the at least one legacy code section comprises:
  selecting, by the refactoring module, one of the multiple parameters comprised in the log;
  identifying, by the refactoring module, at least one further legacy code section, the at least one further legacy code section being configured to calculate parameter values for said selected parameter;
  evaluating, by the refactoring module, a further mapping, the further mapping comprising an assignment of the multiple parameters contained in the log and the second attributes of the data models, said evaluation being executed for identifying one of the second attributes mapped to the selected parameter;

using of the result of the log analysis for automatically replacing the at least one further identified legacy code section with a further new code section, wherein the further new code section comprises a specification of a call to the adapter module for causing the adapter module to generate a single SQL query configured to call the one of the multiple database views that represents the data model comprising the identified second attribute.

For example, said single SQL query may trigger the execution of a routine assigned to a second column of a database view representing said data model for calculating said parameter values. The calculated parameter values may act as the second attribute values of one of the second attributes of said data model.

According to embodiments, the refactoring module may be capable of automatically identifying and replacing legacy code sections which directly accesses one of the source tables of the legacy database via said selected column name by a first new code section as described above and of identifying and replacing legacy code sections being configured to calculate parameter values for a selected parameter by a second new code section as described above.

According to embodiments, the method further comprises:
determining, by the refactoring module, that one of the column names in the log is mapped to two or more of the data models;
triggering, by the refactoring module, the displaying of a user dialog window, the window enabling a user to select one of said determined two or more data models; and
receiving, by the refactoring module, a user's selection via the dialog window of one of said data models;

The new code section that replaces the legacy code section is configured to call the adapter module for causing the adapter module to generate a single SQL query. The single SQL query is configured to call the one of the database views representing the data model that was selected by the user and that comprises the identified first attribute. This may allow a user to decide which one of a plurality of data models which might comprise the relevant attribute should actually be used for retrieving the data having previously been identified by the identified column names in the log.

In a further aspect, the invention relates to method for efficient data retrieval via a telecommunication network, the method being implemented by an adapter module. The adapter module is operatively coupled via the telecommunication network to one or more mobile telecommunication devices and to a database management system hosting a database. The adapter module is interoperable with an application hosted by a sender device. The database comprises multiple database views respectively representing a data model. Each database view is configured for retrieving instances of the data model represented from at least one table of the database upon being called. Each of the multiple database views comprises a first column and a second column. The first column represents a first attribute of the data model represented by said database view. The second column represents a second attribute of the data model represented by said database view. The method comprises:
receiving, by the adapter module, a data retrieval request from the application, whereby at the moment of receipt, the first column of each of the multiple database views has already assigned first attribute values for the first attribute represented by said first column and each second column has assigned a routine for dynamically calculating second attribute values for the second attribute represented by said second column;
evaluating, by the adapter module, the data retrieval request for identifying at least one of the multiple database views that is capable of retrieving, upon being called, data specified in the data retrieval request;
calling, by the adapter module, the identified at least one database view with a single SQL query, thereby retrieving instances of the data model represented by the identified at least one database view, the instances being retrieved via the telecommunication network, the single SQL query comprising a first select criterion directed at the first column of said at least one identified database view and a second select criterion directed at the second column of said at least one identified database view, wherein the retrieving of the data model instances comprises calculating the second attribute values selectively for data model instances having been dynamically identified by means of the first select criterion;
forwarding, by the adapter module, the retrieved instances to the application via the telecommunication network.

In a further aspect the invention relates to a networked telecommunication system for efficient data retrieval via an application. The system comprises a sender device hosting the application and an adapter module and being interoperably coupled to a DBMS hosting a database and to a mobile telecommunication device via a telecommunication network. The database comprises multiple database views respectively representing a data model. Each database view is configured for retrieving instances of the data model represented by said database view from at least one table of the database upon being called. Each of the multiple database views comprises a first column and a second column. The first column represents a first attribute of the data model represented by said database view. The second column represents a second attribute of the data model represented by said database view. The adapter module is configured for:
receiving a data retrieval request from the application, whereby at the moment of receipt, the first column of each of the multiple database views has already assigned first attribute values for the first attribute represented by said first column and each second column has assigned a routine for dynamically calculating second attribute values for the second attribute represented by said second column;
evaluating the data retrieval request for identifying at least one of the multiple database views that is capable of retrieving, upon being called, data specified in the data retrieval request;
calling the identified at least one database view with a single SQL query, thereby retrieving instances of the data model represented by the identified at least one database view, the instances being retrieved via the telecommunication network, the single SQL query comprising a first select criterion directed at the first column of said at least one identified database view and a second select criterion directed at the second column of said at least one identified database view wherein the retrieving of the data model instances comprises calculating the second attribute values selectively for data model instances having been dynamically identified by means of the first select criterion;
forwarding the received instances to the application via the telecommunication network for enabling the application to process the forwarded instances and to return a result of said processing to the mobile telecommunication device via the telecommunication network.

According to embodiments, the networked telecommunication system further comprises the database management system and/or the database. According to embodiments, the networked telecommunication system further comprises the mobile telecommunication device or a plurality of said mobile telecommunication devices.

In a further aspect, the invention relates to a method for automatically or semi-automatically refactoring a legacy application. The method may be implemented by a refactoring module which is configured for analyzing a log of the legacy application and for analyzing the source code of the legacy application; and for using the result of said analyses for automatically replacing legacy code sections of the legacy application by new code sections, thereby creating a refactored application that is capable of forwarding data retrieval requests of a mobile telecommunication device to an adapter module hosted on a sender device. The adapter module is configured for receiving and processing data model instances returned by the adapter module in response to the forwarded data retrieval request.

At least some of the replaced legacy code sections comprise data retrieval statements acting directly on tables of a legacy database for retrieving the first attribute values. The new code sections used for replacing said legacy code sections comprise a call to the adapter module for triggering the adapter module to create a single SQL query. The single SQL query is configured for retrieving at least some of said first attribute values by calling a database view of a refactored database, said database view representing a data model comprising the first attribute whose values were retrieved by the legacy code sections.

Said features may be advantageous, because an automated or semi-automated way of rewriting code of a legacy application is provided that enables the legacy application to make use of the performance gain provided by the interoperation of the adapter module and the database views described above for various embodiments of a data retrieval method. Legacy code sections comprising a direct reference to an outdated, inefficient legacy database may be automatically identified and replaced by new code sections which comprise a call to the adapter module instead. The new code section may also comprise an identifier of a data model or of an attribute that shall be used by the adapter module for a database view-based, efficient data retrieval approach. The refactoring of the database may be performed as described above. For example, data of the legacy database may be transferred to a database of a better performing DBMS, e.g. an in-memory database whose data is organized in the column store format. Said database may be supplemented with some additional database views and tables as described already for embodiments of the data retrieval method.

According to embodiments, the log is descriptive of legacy SQL queries directed at a legacy database. The legacy database may comprise the first attribute values in one or more source tables and may lack the database views representing the data models. The legacy SQL queries contained in the log may comprise column names of the legacy database. The using of the result of the log analysis for automatically replacing the legacy code sections by the refactoring module may comprise: selecting one of the column names comprised in the log; identifying one or more of the legacy code sections which directly access tables of the legacy database via said selected column name; evaluating a mapping, whereby the mapping comprises an assignment of the column names contained in the log and one of the first attributes of the data models. The mapping may be provided and specified, for example, by a user. For example, in the mapping column names of the legacy database may be mapped to equally named attributes of the data models. The evaluation of the mapping enables the refactoring module to identify one of the first attributes mapped to the selected column name and to replace said one or more identified legacy code sections automatically by one of the new code sections. Said one new code section may be configured to call the adapter module for causing the adapter module to generate a single SQL query configured to call the one of the database views that represents the data model comprising the identified first attribute.

According to embodiments the log is descriptive of legacy procedures of the legacy application having been executed for calculating parameter values of one or more parameters. Said parameter values may be absent from the legacy database, e.g. because the parameter values were calculated by the legacy application itself, and thus, within in the application layer.

Using the result of the log analysis for automatically replacing the legacy code sections may be implemented by the refactoring module and comprise: selecting one of the parameters comprised in the log; identifying one or more of the legacy code sections which are configured to calculate parameter values for said selected parameter; evaluating a mapping, the mapping comprising an assignment of the parameters contained in the log and one of the second attributes of the data models, for identifying one of the second attributes mapped to the selected parameter; and replacing said one or more identified legacy code sections automatically by one of the new code sections. Said one new code section may be configured to call the adapter module for causing the adapter module to generate a single SQL query. The single SQL query may be configured to call the one of the database views that represents the data model comprising the identified second attribute.

According to embodiments, the refactoring module determines that one of the column names in the log is mapped to a first attribute being contained in two or more of the data models and triggers the displaying of a user dialog window. The window enables a user to select one of said determined two or more data models. The refactoring module receives a user's selection via the dialog window of one of said data models. The new code sections replacing the legacy code sections are configured to call the adapter module for causing the adapter module to generate a single SQL query configured to call the one of the database views that represents the data model that was selected by the user and that comprises said first attribute.

According to embodiments the log is descriptive of legacy procedures of the legacy application, whereby said legacy procedures were executed for calculating parameter values of one or more parameters whose parameter values are absent from the legacy database. Using the result of the log analysis for automatically replacing the legacy code sections comprises: selecting one of the parameters comprised in the log; identifying one or more of the legacy code sections which are configured to or comprise instructions for calculating parameter values for said selected parameter; evaluating a mapping, the mapping comprising an assignment of the parameters contained in the log and one of the second attributes of the data models. The mapping is evaluated for identifying one of the second attributes mapped to the selected parameter; and replacing said one identified legacy code section automatically by one of the new code sections. Said one new code section is configured to call the adapter module for causing the adapter module to generate a single SQL query configured to call the one of the database views that represents the data model comprising the identified second attribute.

According to embodiments the refactoring module determines that one of the parameters in the log is mapped to a second attribute being contained in two or more of the data models and triggers the displaying of a user dialog window. The window enables a user to select one of said determined two or more data models. The refactoring module receives a user's selection via the dialog window of one of said data models. The new code sections replacing the legacy code sections are configured to call the adapter module for causing the adapter module to generate a single SQL query configured to call the one of the database views that represents the data model that was selected by the user and that comprises said second attribute.

In a further aspect, the invention relates to a non-volatile computer readable storage medium comprising instructions which, when executed by a processor, cause the processor to perform a refactoring method implemented by the refactoring module according to any one of the above embodiments.

In a further aspect, the invention relates to a computer system comprising memory and the above mentioned non-volatile storage medium and a processor for executing the instructions stored thereupon.

A "sender device" as used herein is a data processing machine, e.g. a server, dedicated to providing some information for other telecommunication partners via a network. The sender device may be, for example, an application server hosting an application server program comprising one or more applications.

A "mobile telecommunication device" as used herein is a device that is able to transmit telephonic, electronic, digital, cellular, or radio communications via a network to another device. A telecommunication device may be, for example and without limitation, a mobile phone, in particular a smart phone, a tabloid computer, or the like.

A "telecommunication network" as used herein is a collection of terminals, links, and processors which connect together so that communications can be made. A "telecommunication network" is a collection of terminals, devices, and processors which connect together so that communications can be made. A "digital cellular wireless telecommunication network" is a telecommunication network that provides services by using a large number of base stations, each covering only a limited area. It may allow a number of mobile telecommunication devices to communicate with each other and with other devices anywhere in the network. For example, the cellular network may use Global Systems for Mobile Communication (GSM), Code Division Multiple Access (CDMA) or other technologies.

A "database" is an organized collection of data. The data is typically organized in tables. According to some embodiments, the database is a relational database, in particular a column-oriented database or a row-oriented database.

A "database management system" (DBMS) is a hardware- and/or software based system designed to allow the definition, creation, querying, update, and administration of databases. A "database view" or "view" is a stored SQL query on some data of a database and provides a virtual result set that database users can query just as they would in a persistent database collection object (e.g. a table). This stored, pre-established query may be kept in the database dictionary. Unlike ordinary base tables in a relational database, a view does not form part of the physical schema: rather, it provides a virtual table the actual contents of which are computed or collated dynamically from data in the database when access to that view is requested. Changes applied to the data in a relevant underlying table are reflected in the data shown in subsequent invocations of the view.

A "module" is a synonym for an "application" or "application program" or a functional part thereof.

A "routine" is a piece of program logic that may be implemented as script, as SQL statement, as a function of a programming language such as ABAP, Java or C# or the like.

A "data model" or "model" is a data structure representing a real-world object and comprising one or more attributes.

A "legacy application" is an application that has been in use in the past, often for many years, and that comprises program logic which shall also be used in the future. A legacy application may communicate with other legacy applications or legacy databases. A legacy SQL query may be an SQL query having been adapted to the table structure of a legacy database that was formerly used by the legacy application to retrieve data from said legacy database.

The term 'computer memory' or 'memory' as used herein encompasses a computer readable storage medium which is directly accessible to a processor. Examples of computer memory include, but are not limited to: RAM memory, registers, and register files of a processor.

The term 'computer storage' or 'non-volatile storage' as used herein encompasses any non-volatile computer readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

BRIEF DESCRIPTION OF THE DRAWINGS

In the following embodiments of the invention are explained in greater detail, by way of example only, making reference to the drawings in which:

FIG. 3 illustrates two approaches for transforming a legacy database into a database that supports the efficient data retrieval method, FIG. 4 is a flow chart of a prior art data retrieval approach.

DETAILED DESCRIPTION

In the following, embodiments of the data retrieval method and corresponding system will be described which may allow to increase the response time and/or save computational resources when requesting data via a telecommunication network from existing legacy Applications.

Figure 1:
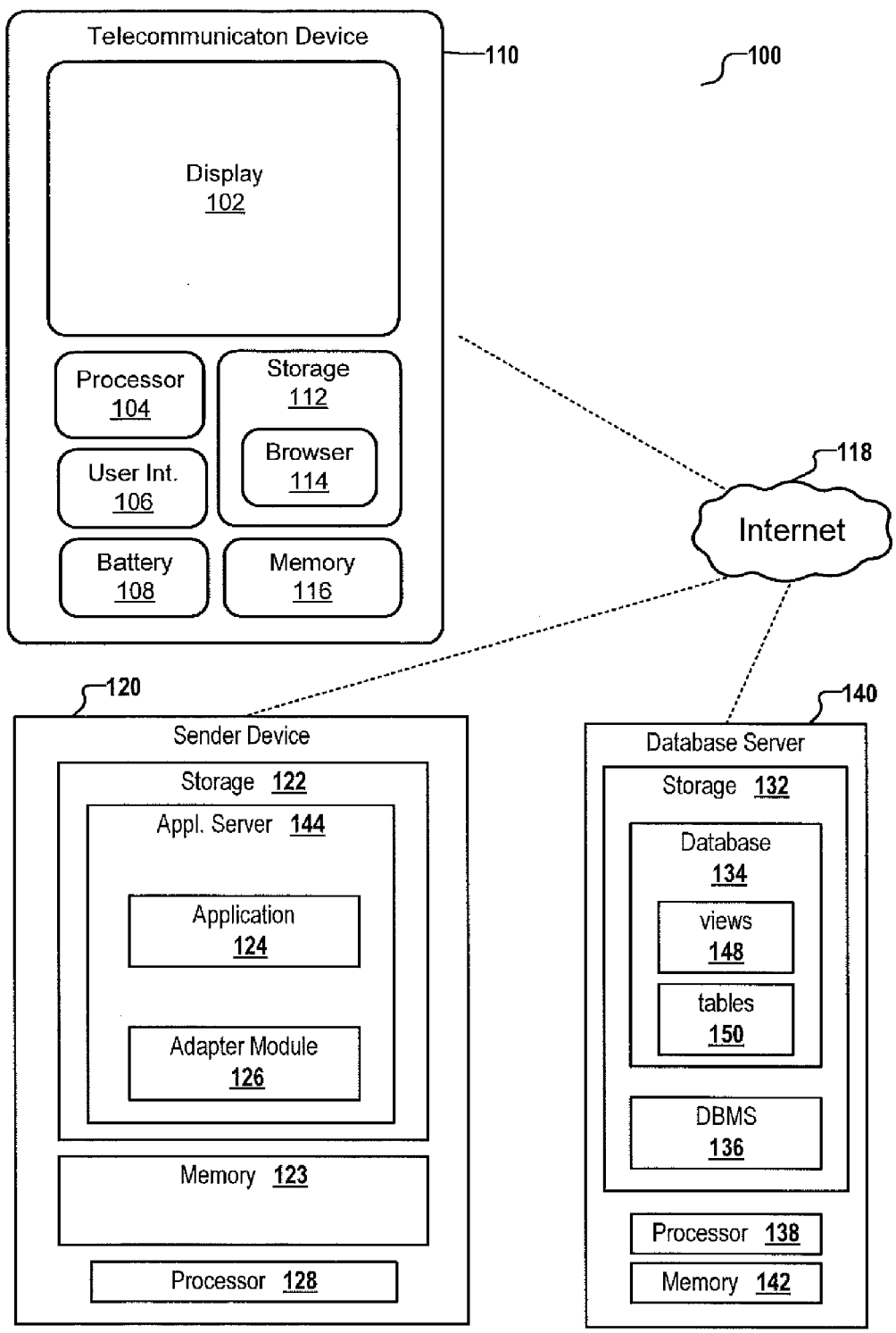
FIG. 1 is a block diagram of a telecommunication system according to an embodiment.

FIG. 1 is a block diagram of a telecommunication system 100 according to an embodiment. The system comprises a mobile telecommunication device 110, e.g. a mobile, phone, in particular a smart phone. The telecommunication device comprises a battery 108, memory 116, non-volatile data storage 112 and a processor 104. The device may further comprise a user interface 106 for receiving a user's input data, e.g. a keyboard or a touch screen. The processor may be configured to execute a client application 114 that is operable to create a data retrieval request to be submitted to a sender device 120 via a network connection 118, e.g. a mobile internet connection. For example, the client program may be a standard browser such as Firefox or Internet Explorer operable to display a graphical user interface, e.g. a HTML web-form to a user of the telecommunication device. Alternatively, the client program 114 may be an application module having been specially developed for requesting data from an application 124, e.g. a Business Suite application, hosted on a remote sender device 120.

The mobile telecommunication device may send a data retrieval request via a mobile network communication 118 to an application 124 hosted by a sender device 120. The sender device may be a server computer, a computer in a cloud environment providing a cloud service or any other kind of data processing device. The sender device also comprises a storage medium 122, memory 123 and a processor 128. The sender device may host an application server program 144 comprising the application 124 having received the request. The application 124 may be, for example, a legacy Business Suite application that may have been automatically or semi-automatically refactored for making said legacy Business Suite interoperable with the adapter module 126 and the database view-based data models of the database 134.

The sender device may be coupled via the network connection 118 to a database server 140 comprising a non-volatile storage 132, a processor 138 and memory 142. The database server may have installed a DBMS 136 configured to manage a database 134 comprising multiple database views 148 and database tables 150. The database may be a conventional storage-based database or, more preferentially, may be an in-memory database.

The telecommunication system may enable the telecommunication device to retrieve data via application 124 from the database 134 very quickly and in a resource serving manner. This may be achieved by an adapter module that enables the application 124 to make use of an efficient data retrieval approach based on database view-based data models and on a reduction of the number of data records for which attribute values are calculated dynamically. The data retrieval may be so fast that the telecommunication device will receive all resulting data records that can be displayed on its display 102 in real time even if the sender device 120 does not cache the totality of data records which match a particular query. The details of achieving the performance acceleration will be described in greater detail below.

Figure 2:
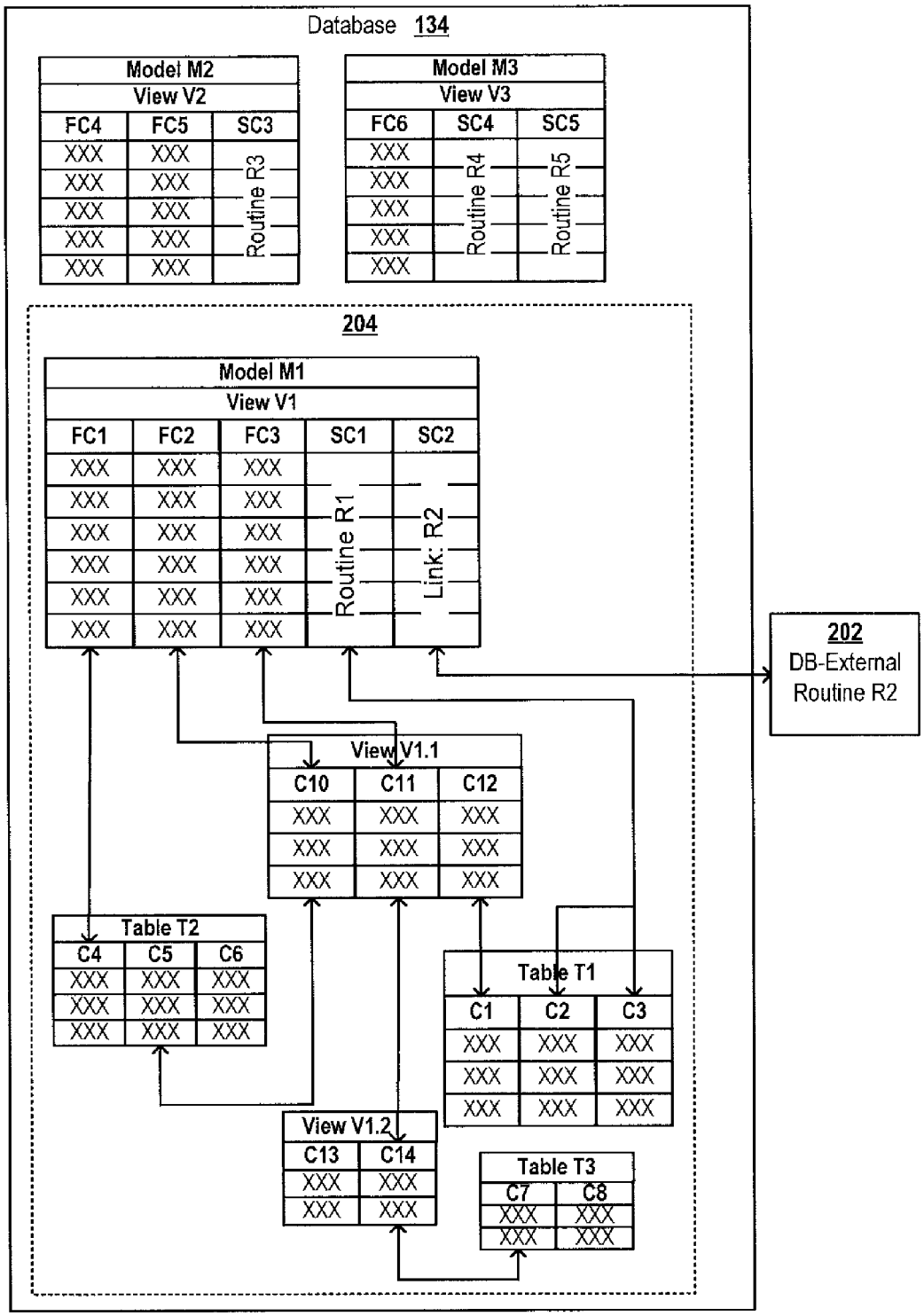
FIG. 2 is a block diagram of multiple database views and tables.

FIG. 2 is a block diagram of multiple database views V1, V2, V3, V1.1, V1.2 and tables T1, T2, T3 which may allow for a very efficient, data model based data retrieval. FIG. 2 shows the database views 148 and tables 150 of FIG. 1 according to one embodiment in greater detail.

The database views 148 may comprise some database views V1, V2, V3 which respectively represent a data model M1, M2, M3. A data model may be a model for a data object, e.g. a business data object. Said object may represent a physical entity of the real world, e.g. a machine, a production line, a produced good, a customer, an order or a supplier. Each data model may comprise one or more attributes. For example, a data model M1 representing a machine of a production line may comprise attributes like 'location', 'type', year of manufacture', 'output-per-year' or 'status'. A data model M2 representing a supplier of some consumables used during the production process may comprise attributes like 'company-name', 'street', 'zip-code', or 'total amount billed per annum'.

The database views 148 may also comprise some further database views V1.1, V1.2 which do not represent a data model. For example, database views V1.1, V1.2 may be part of a hierarchy 204 of database views and tables which are child-elements of a root element V1. The root element is a database view V1 representing a data model M1. When the root element database view V1 is called, the SQL routines specified in database view V1 will retrieve data from the tables T1, T2, T3 of said hierarchy and will call database views V1.1 V1.2 which comprise some SQL-based data retrieval and processing logic for processing and/or aggregating the data contained in said tables T1, T2, T3 for retrieving attribute values assigned to each of the columns FC1, FC2, FC3, SC1, SC2 of the root element database view V1.

The database view V1 may comprise one or more first columns FC1, FC2 FC3. Each first column represents a respective first attribute of the data model M1 represented by said database view V1. Each of said first columns has assigned one or more attribute values of a first attribute represented by said first column. The attribute values of the first attributes are already stored in the database 134 at the moment when the application 124 receives a data retrieval request. For example, first column FC1 representing a first attribute 'location' may have assigned column C4 of table T2 which has stored a plurality of location values (e.g. room-IDs, building-IDs or GPS data) of several machines being part of a production line) already at the moment when receiving a request. Another first column FC2 representing a first attribute 'type' may have assigned column C10 of database view V1.1 which has assigned column C5 of table T2 which has stored a plurality of machine type values. The machine types of multiple machines belonging to a production line may thus be assigned to the first column FC2 and may also already be stored in the database 134 at the moment when the request is received. Thus, the assertion that a data model M1 "being represented" by a database view V1 may imply that at least one of the first columns represents a first attribute of said data model and that at least one of the second columns represents a second attribute of said data model. For example, the column names could be identical to or could be mapped to the attribute names of the data model. A database view may in addition comprise some program logic, e.g. in the form of predefined table joins, which allow to retrieve first and second attribute values at runtime, e.g. by executing a SELECT statement on a table comprising the first attribute values or by executing a routine for calculating a second attribute value dynamically.

The database view V1 may comprise one or more second columns SC1, SC2. Each second column represents a respective second attribute of the data model M1. Each of said second columns has assigned a routine R1 R2 configured to calculate, upon being called, one or more attribute values of the second attribute represented by the second column to which said routine is assigned. For example, second column SC1 representing a second attribute 'output-per-year' may have assigned routine R1 which is configured to calculate, upon being called, the number of goods produced (output) by a particular machine per year. The routines calculate the attribute values represented by their respective second column dynamically upon being called when a data retrieval request triggers the generation of a single SQL query calling the database view V1. The attribute values of the second attributes are not stored in the database 134 at the moment when the application 124 receives a data retrieval request. Rather, the attribute values for the second attributes are calculated for the requested instances of the data model M1 (e.g. machines) dynamically in response to the receiving of the data retrieval request. For example, the "output-per-year" attribute values may be calculated dynamically from a plurality of database tables comprising information on the total number of produced goods and the total number of rejected goods or a reject-rate per machine.

Attribute values of a first attribute may also be referred herein as 'first attribute values'. First attribute values are already stored in the database at the moment of receiving the request. Attribute values of a second attribute may also be referred herein as 'second attribute values'. Second attribute values are not stored in the database at the moment of receiving the request but rather are calculated dynamically.

The retrieval of the requested data may be faster than in state of the art approaches, because the DBMS at first evaluates one or more first select criteria on first attribute values of first attributes being represented by a respective one of the first columns of the identified database view V1. The evaluation results in a selection of a first set of instances of the data model M1 represented by the database view identified and selected by the adapter module upon evaluating the data retrieval request. The first set of data model instances thus is a sub-set of all instances of the data model M1 stored in the database. For example, a first select criterion directed at first column FC1 may specify the location of a particular factory. As a result, only machine data records (instances of the data model M1 'machine') will be included in the first set whose first attribute value 'location' is within the location of said particular factory. Another first select criterion directed at first column FC2 may specify a particular machine type, e.g. "type-XZ277R". As a result, only machine data records (instances of the data model M1 'machine') will be included in the first set whose first attribute value 'type' assigned to the first column FC2 is "type-XZ277R". Thus, the first set will only comprise data records for machines of type type-XZ277R located in the particular factory. As the first attribute values are already stored in the database and preferentially have respectively assigned an index for allowing an efficient search, the first set of data model instances can be determined very quickly.

After having identified and selected said first set of data model instances, the DBMS calculates the second attribute values selectively for the instances of the first set of instances by executing the routine R1, R2 assigned to the one or more second columns SC1, SC2 at which a respective one of the second select criteria is directed. For example, in case the data retrieval request comprises an indication that the 'output-per-year' for year 2011 should be returned, the single SQL query generated by the adapter module will comprise a second select criterion that is directed at the second column SC1 representing the second attribute 'output-per-year'. The DBMS will perform routine R1 in response to the receiving of the request and dynamically calculate the second attribute values 'output-per-year' for 2011 selectively for the data model instances contained in the first set of data model instances. Thus, instead of calculating the 'output-per-year' value for all machines in the database, the 'output-per-year' is calculated dynamically in response to receiving the request only for the data model instances of the first set of instances (in this example: only for machines of a particular type located in a particular factory).

In some embodiments, one or more of the routines R2 used for calculating the second attribute values may be part of a program logic 202 that is external to the DBMS 136. In some embodiments, the program logic 202 may consist of multiple copies respectively comprising the routine R2 and being operable to calculate the second attribute values of the second attribute represented by the second column to which said routine R2 is assigned in parallel on multiple separate CPUs. This may further increase the performance of calculating the second attribute values. In particular in cloud environments where thousands of mobile telecommunication devices may submit a data retrieval request to the sender device concurrently, calculating at least some of the second attribute values on separate CPUs in parallel may reduce the processing load of the processor 138 of the database server 140 hosting the DBMS, thereby increasing performance of data retrieval.

FIG. 3 illustrates two approaches for transforming ('refactoring') a legacy database 302, 304 into a database 134 that supports the efficient database view-based data retrieval method described in FIG. 2.

According to one scenario, a Business Suite application may comprise some routines for accessing a legacy database 302 that is considered as too slow or outdated for other reasons. For example, the operator of the Business Suite may wish to switch to a better performing in-memory database, e.g. SAP HANA. In many cases, the content and schemes of the database tables can be maintained largely unaltered. In this case, a script or a program routine may automatically evaluate the database schemas of the legacy database tables 150', create tables 150 in the new, better performing database 134 in accordance with said schemas, and automatically copy the data stored in the tables 150' of the legacy database 302 to the tables of the new database 134. Thus, the Business Suite application may at least to some extent be able without refactoring to retrieve data from the new database 134 because the old SQL queries will match the new database structure.

According to another scenario, a Business Suite application 124 may comprise some routines for accessing a legacy database 304 whose table schemes are not suited for use in the new, better performing database 134. In this case, a script or a program routine may automatically transform the database schemas of the legacy database tables 306, create tables 150 in the new, better performing database 134 in having a different schema, and automatically copy the data stored in the tables 306 of the legacy database 304 to the tables 150 of the new database 134. The distribution of the transferred data in the target tables may significantly differ from the distribution of the data in the source table. Thus, the Business Suite application may not be able without refactoring to retrieve data from the new database 134 because the old SQL queries will not match the new database structure.

In both scenarios, the transferred data may be retrieved directly from the tables of the new database 134. For example, the second attribute values which are neither contained in the source databases 302, 304 nor in the new database 134 may be calculated by the application 124. However, for further increasing the performance of data retrieval, the new database 134 is supplemented with database views 148 whereby at least some of said database views represent a respective data model as described in detail for FIG. 2. Supplementing a database 302 304 with the database views may comprise linking the database views to existing tables 150 and optionally also to existing database views of the database 134 in order to create hierarchical data structures 204 as depicted in FIG. 2 for efficiently retrieving data model instances via database JOINs.

After having supplemented the database with the database views 148, the application 124 does not retrieve the data directly from the database 134 any more. Rather, the application 124 forwards a data retrieval request received from a mobile telecommunication device to the adapter module 126. The adapter module is operable to evaluate the forwarded data retrieval request and to evaluate the available database views 148 and data models for transforming the data retrieval request to a single SQL query that is configured to call a database view whose represented data model instances comprise the requested data in form of first and second attribute values. Thus, the adapter module may act as a translator capable of transforming legacy data retrieval requests into single SQL queries which are directed at a particular one of the database views capable of retrieving the requested data. This database view-based way of data retrieval provides much better performance, because database operations such as JOIN statements operating on primary and secondary keys can be executed much quicker than assembling the required data objects in the application layer. In addition, CPU and memory resources of the sender device are saved because the retrieving and processing of the requested data is pushed—at least in part—to a separate processing device, the database server 140. This may be particularly advantageous in a context where many thousand telecommunication devices 110 request data from the Business Suite application 124 concurrently.

Figure 7:
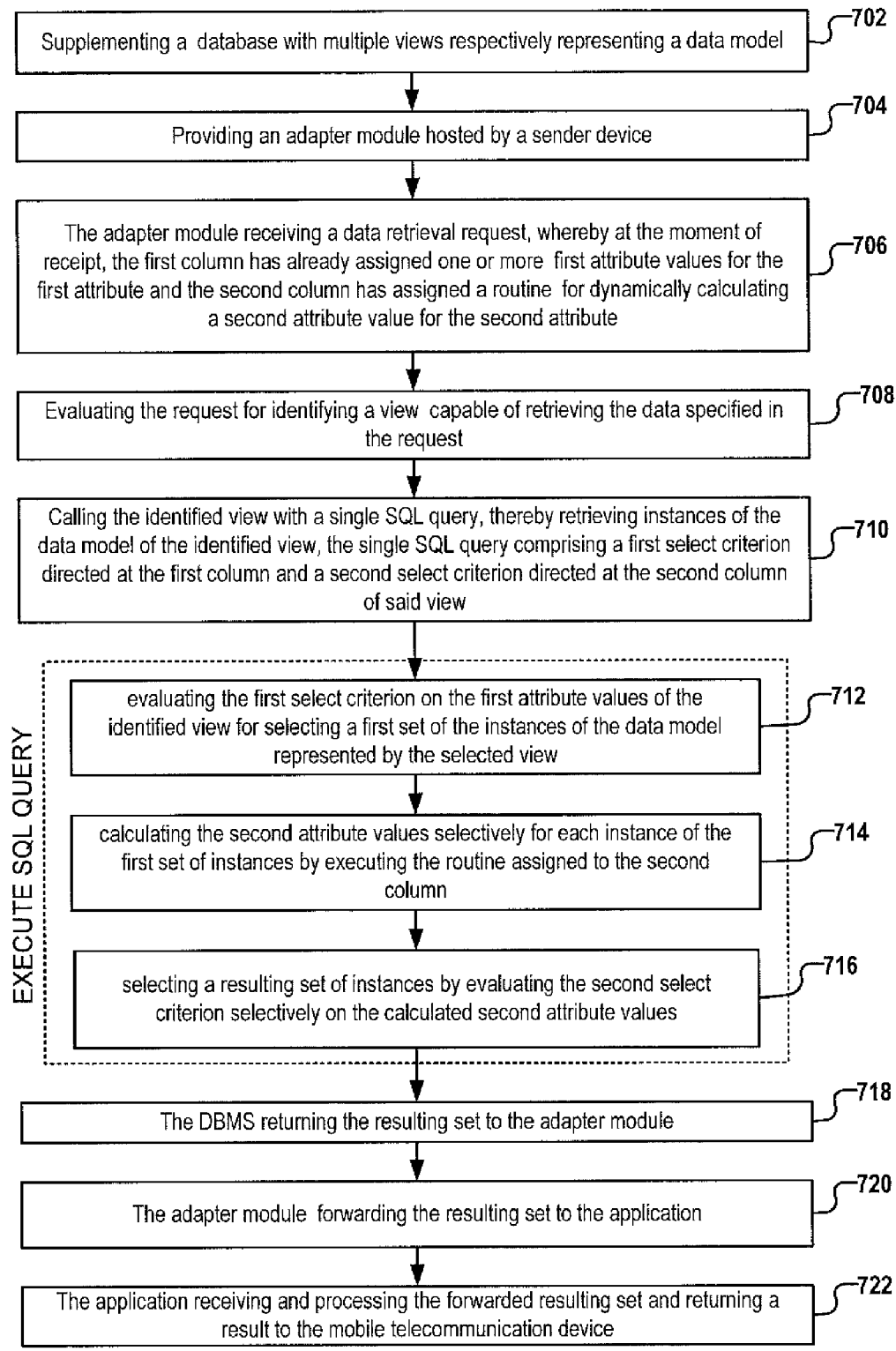
FIG. 7 is a flow diagram of an efficient data retrieval method.

FIG. 4 is a flow chart of a prior art data retrieval approach that will be described in the following in combination with FIG. 7. In former Business Suite applications, a client device 401, e.g. a desktop computer of an employee of a company operating a legacy Business Suite application 402, may send a data retrieval request to said legacy application 402. The request may comprise an indication that data records 11-20 should be retrieved. The legacy application 402 receives the request and generates one or more database queries which receive the requested data directly from some tables of a legacy database 302, 304. As the data retrieval request may comprise select criteria directed at existing as well as at non-existing data values, the non-existing data values are generated for all values stored in a respective column. As a result, millions of data records may have to be processed and the data retrieval step may be so costly that all data records LRS of the legacy database that have been identified to match all select criteria are returned to the sender device irrespective of whether the client 401 requested all records or records 1-10 or records 11-20. This results in high network traffic between the database server and the computer hosting the legacy application.

The computer hosting the legacy application 402 may further process the millions of received database records LRS and store them to a cache, e.g. a section of the main memory and/or a non-volatile storage medium. Only a fraction of the records in the cache, e.g. records 11-20, will be returned to the client 401. When a user of the client device 401 requests the next page of data records, e.g. records 21-30, said records will be retrieved from the cache of the computer hosting the legacy application 402. There will not be executed a further database query.

Thus, in said prior art approach, data retrieval in response to a first request of a client device may take hours or even days and the result set needs to be cached to avoid a further time consuming database access. This approach is not considered acceptable today, because results are expected to be received in real time and caching of millions of data records may not be feasible in cloud environments where session data of many thousand client devices would have to be managed and held in memory concurrently.

Figure 5:
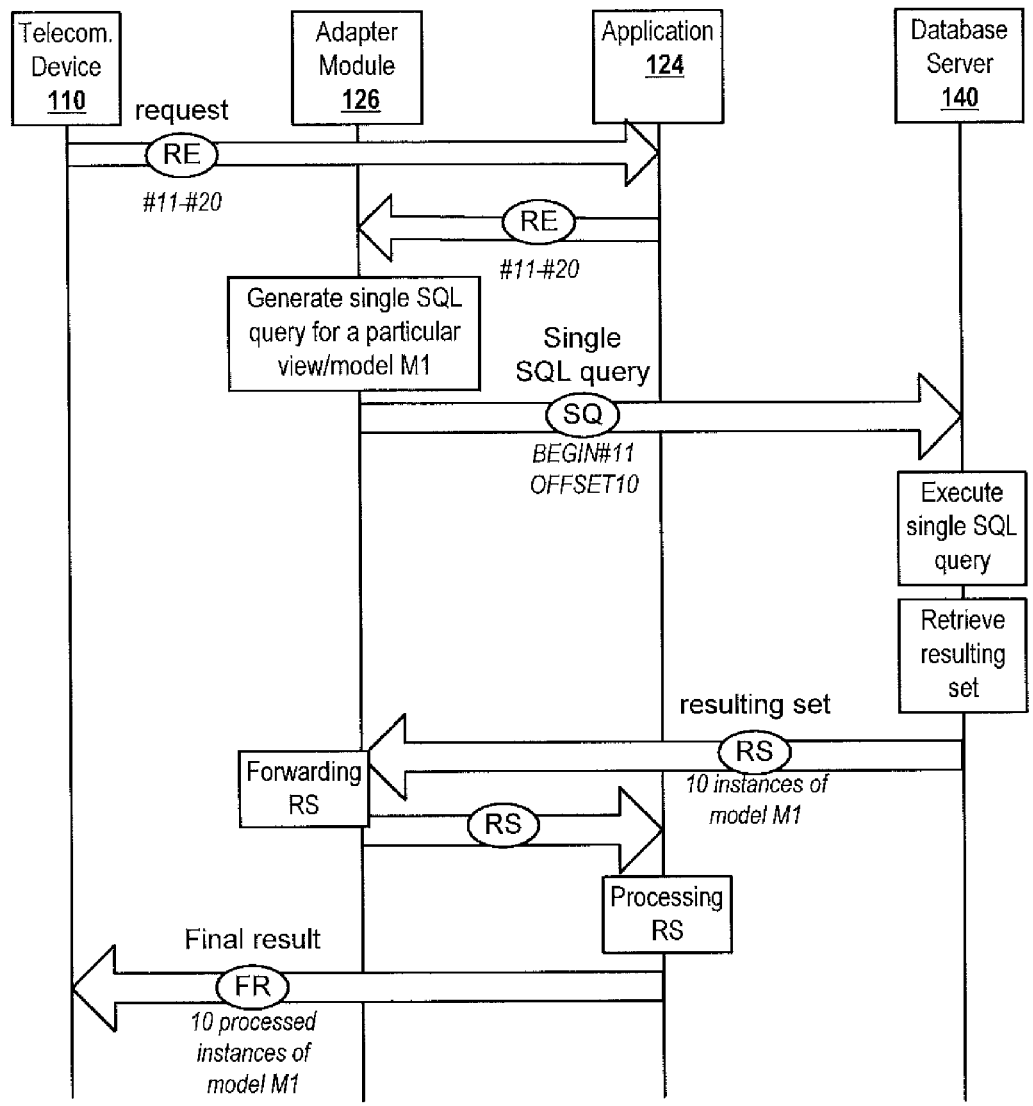
FIG. 5 is a flow chart of an efficient, data model and adapter based data retrieval approach.

FIG. 5 is a flow chart of an efficient, data model and adapter based data retrieval approach according to embodiments of the invention.

At first, a database, e.g. a legacy database 302, 304 is supplemented in step 702 with multiple database views 148; V1, V2, V3, V1.1, V1.2 for enabling efficient data retrieval from the database, thereby providing for a refactored, more efficient version of the database. The supplementing of the database may be combined with transferring data from a legacy database managed by a legacy DBMS to a more efficient database, e.g. an in-memory DBMS. At least some of the database views V1, V2, V3 respectively represent a data model M1-M3. Each database view representing a data model is configured for retrieving instances of its represented data model from one or more tables T1, T2, T3 and/or other database views V1.1, V1.2 of the database upon being called as described for FIG. 2.

In addition, an adapter module 126 may be deployed in step 704 to the sender device hosting an application 124, e.g. a Business Suite application having been refactored for making it capable of interacting with the adapter module 126.

A mobile telecommunication device 110 may send a data retrieval request RE to the application 124. The telecommunication device may send the same kind of request to the refactored application 124 as before the refactoring. The application 124 may forward the request to the adapter module 126 which may also be hosted on the same device 120 as the application 124.

The adapter module receives the data retrieval request RE from the application in step 706. The request RE may comprise pagination information, e.g. may comprise a start number #11 and an end number #20 indicating the first and last list number of the data records that shall be displayed concurrently on a display 102 of the mobile telecommunication device 110. At the moment of receipt, the first columns FC1, FC2, FC3 of the database views V1, V2, V3 of the database have already assigned one or more first attribute values for first attributes represented by respective first columns of said database views.

The second columns SC1, SC2 respectively have assigned a routine R1, R2 for dynamically calculating a second attribute value for the second attributes represented by said second columns.

In step 708, the adapter module evaluates the data retrieval request RE for identifying at least one database view V1 that is capable of retrieving, upon being called, the data specified in the request RE.

In step 710, the adapter module generates a single database Query and calls the identified database view V1 with the generated single SQL query SQ, thereby retrieving instances of the data model M1 represented by the identified database view V1 via the telecommunication network. The single SQL query comprises a first select criterion directed at a first column FC1-FC3 and a second select criterion directed at a second column SC1, SC2 of said identified database view. The retrieving of the data model instances comprises calculating the second attribute values selectively for instances of said data model M1 having been dynamically identified by means of the first select criterion.

In step 720, the adapter module forwards the retrieved instances to the application 124 via the telecommunication network 118.

In step 722, the application receives and processes the forwarded instances of the identified data model M1 and returning a result of said processing to the mobile telecommunication device via the telecommunication network.

Figure 6:
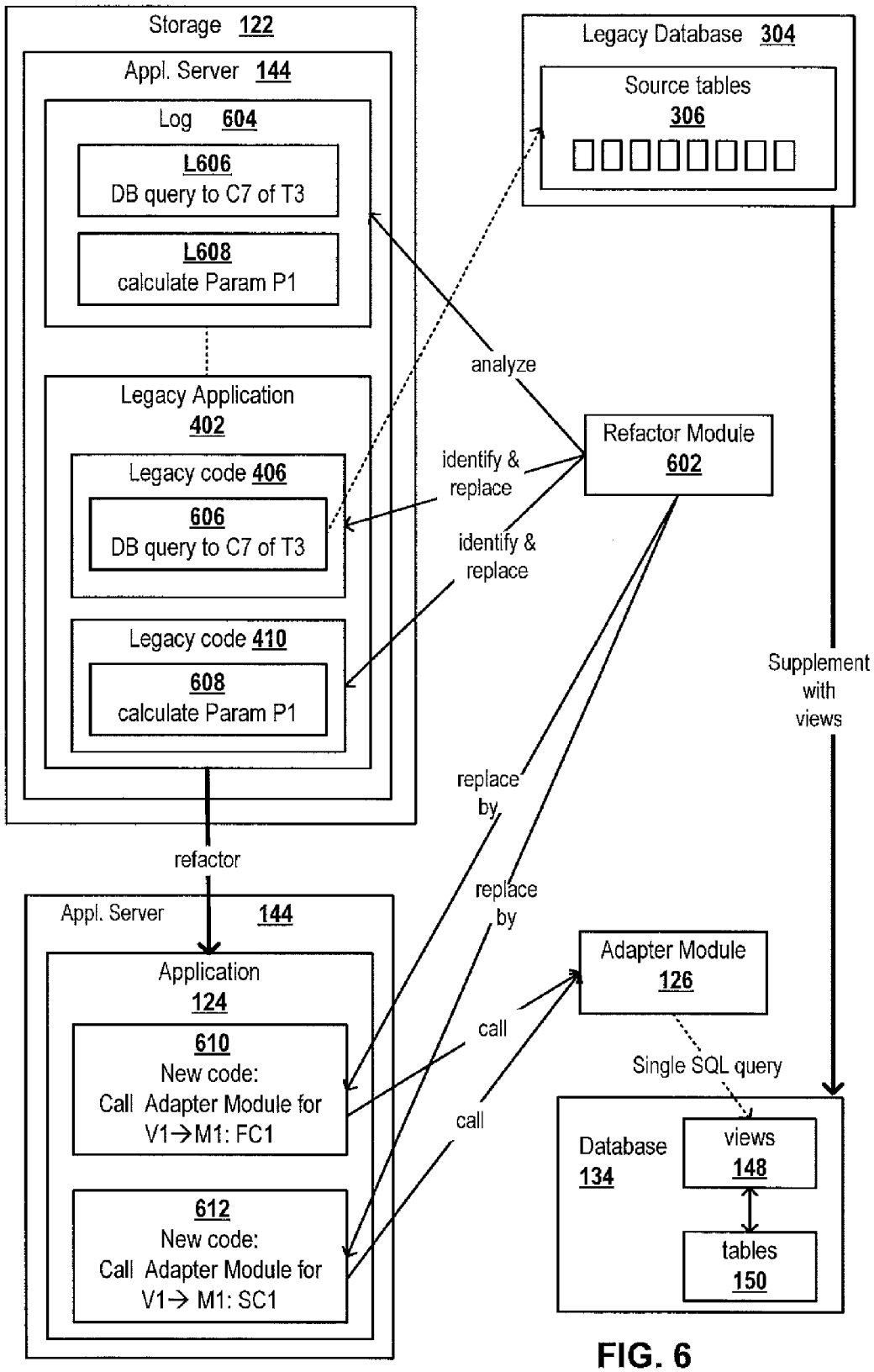
FIG. 6 is a block diagram illustrating a refactoring of a legacy application for providing the application supporting the efficient data retrieval method.

FIG. 6 is a block diagram illustrating an automated or semi-automated method of refactoring of a legacy application 402 for providing a new, refactored application 124 capable of supporting the efficient data retrieval method. Also, FIG. 6 illustrates an automated or semi-automated method of transforming a legacy database 302, 304 into a new high performance database 134.

a) Legacy System, Refactored System

The upper part of FIG. 6 shows a legacy data retrieval system comprising a legacy application 402, e.g. a legacy Business Suite application that retrieves data from a legacy database 306 as described for FIG. 4. The legacy application may be hosted by an application server program 144 running on a data processing machine, e.g. a server used as sender device.

The legacy application 402 may comprise some first source code sections 606 which are capable of directly accessing database tables of the legacy database for retrieving some data when being executed. The legacy application 402 may further comprise some second source code sections 608 which are, upon execution, capable of calculating parameter values of requested parameters which are not stored in the legacy database at the moment when a data retrieval request is received.

A log 604 may comprise information L606 being indicative of when the legacy application 402 generated and executed some database requests upon executing any one of the first source code sections 606. Said information L606 may comprise, for example, the names of the tables and columns accessed in the legacy application.

The log 604 may further comprise information L608 being indicative of when the legacy application 402 executed any one of the second source code sections 606. Said information L608 may comprise, for example, the names parameters P1 whose parameter values are calculated at runtime by the legacy application 402.

Depending on the embodiment, the log may be generated by the application server program 144 hosting the legacy application or by the legacy application. The log may be a file, a database table or any other kind of data structure comprising history data of the operations performed by the legacy application 402.

The lower part of FIG. 6 shows a new, refactored data retrieval system comprising a new application 124 having been generated by a refactoring module which automatically refactored the legacy application 402. The refactored data retrieval system also comprises a high-performance database 134 having been generated by a script or the refactoring module by automatically transferring data from a legacy database 302, 304 to the new database 134 and supplementing the new database with the database views 148 for efficient data retrieval as described in FIGS. 2 and 3.

For providing optimum performance, both the legacy application and the legacy database as depicted in the upper part of FIG. 6 need to be refactored for obtaining the refactored application 124 and database 134.

b) Database Refactoring:

As was explained already for FIG. 3, a script or a refactoring module 602 may automatically or semi-automatically copy the data contained in a legacy database 302, 304 to a new database 134 that is performance optimized. For example, database 134 could be an in-memory column-store database such as SAP Hana®. Depending on the embodiments, the structure of the legacy database and the new database may largely be identical or may differ from each other. The new database is then supplemented with database views 148 supporting efficient data retrieval via data models. In the new database 134 the table columns comprising the transferred data are linked via primary and secondary database keys to database views V1-V3 which allow for a data model-based, efficient retrieval of data records by means of a cascading set of JOIN operations along a hierarchy of database views and tables.

c) Application Refactoring:

The refactoring module 602 may analyze the log 604 and identify a log entry L606 being descriptive of the legacy application 124 having accessed the legacy database 302, 304 in the past for retrieving data, e.g. from column C7 of table T3. The module 602 may extract the column names and column names specified in said log entry L606 and search the source code of the legacy application 402 for identifying code sections comprising the combination of said identified column names and table names whose execution was logged in log entry L606. In addition or alternatively, each executable code section 606 (which may be, for example, a function or program routine) may comprise a function-ID. When executing said function, the names of the accessed tables and columns of the database may be stored in association with the function-ID in the log 604.

The refactoring module 602 may evaluate the attributes of the available modules in the new database 134 for identifying one or more database views which comprise column names that are equal to the column names contained in said log entry L606. Alternatively, the refactoring module may be able to access a mapping, whereby said mapping assigns column names of the legacy database contained in the log 604 to attributes of one or more data models M1-M3 represented by respective database views V1-V3 in the refactored database 134.

In case the refactoring module identifies more than one database view (and, correspondingly, more than one module) that matches or is assigned to the table and column names contained in log entry L606, the refactoring module may prompt a user to select one of the identified database views or data models. After having automatically or semi-automatically identified a data model and corresponding database view that comprises the attributes and columns that correspond to the column names in the log entry, the refactoring module replaces the source code section 606 having previously sent a data retrieval request to the legacy database 302 304 by a new code section 610 that comprises a call to the adapter module 126. Said call may comprise an ID of the data model or database view for which the adapter module should generate, in response to said call, a single SQL query SQ. This replacement of code section 606 by new code section 610 enables the legacy application 402 to call the adapter module to execute a database view-based, rapid data retrieval adapted to the supplemented database views contained in the refactored high-performance database.

The refactoring module 602 may further analyze the log 604 and identify a log entry L608 being descriptive of the legacy application 124 having calculated parameter values for a parameter P1 which were not stored in the legacy database but rather were calculated dynamically by the legacy application 402 itself. The module 602 may evaluate the log entry L608 and search the source code of the legacy application 402 for identifying code sections comprising the parameter name P1 whose parameter value calculation was logged in log entry L608. In addition or alternatively, the executable code section 608 may comprise a function-ID.

When executing said function 608, the parameter name may be stored in association with the function-ID in the log 604.

The refactoring module 602 may evaluate the attributes of the available modules in the new database 134 for identifying one or more database views which comprise column names that are equal to the parameter names contained in said log entry L608. Alternatively, the refactoring module may be able to access a mapping, whereby said mapping assigns parameter names whose parameter value calculation was performed by the legacy application was stored in the log 604 to attributes of one or more data models M1-M3 represented by respective database views V1-V3 in the refactored database 134. In case the refactoring module identifies more than one database view (and, correspondingly, more than one module) that matches or is assigned to the parameter names contained in log entry L608, the refactoring module may prompt a user to select one of the identified database views or data models.

After having automatically or semi-automatically identified a data model and corresponding database view that comprises the attributes and columns that correspond to the parameter names in the log entry L608, the refactoring module replaces the source code section 608 having previously calculated parameter values for parameter P1 by a new code section 612 that comprises a call to the adapter module 126. Said call may comprise an ID of the data model or database view for which the adapter module should generate, in response to said call, a single SQL query SQ. This replacement of code section 606 by new code section 612 enables the legacy application 402 to call the adapter module to execute a database view-based, rapid data retrieval adapted to the supplemented database views contained in the refactored high-performance database. The call of the new code section 612 may comprise the parameter name P1 as a second select criterion that is directed at one of the second columns SC1, SC2 of the identified database view. The calculation of the parameter values may be executed by a routine R1 assigned to said second column by a processor of the database server or may be executed by a database-external routine R2 executed by a processor of a remote server.

LIST OF REFERENCE NUMERALS 100 telecommunication system
102 display
104 processor
106 user interface
108 battery
110 mobile telecommunication device
112 non-volatile storage device
114 browser
116 main memory
118 telecommunication network
120 sender device
122 non-volatile storage device
123 main memory
124 application
126 adapter module
128 processor
132 non-volatile storage device
134 database
136 DBMS
138 processor
140 database server
142 main memory
144 application server program
148 database views
150 database tables
150' database tables
M1-M3 data models
V1-V3 database views
FC1-FC4 first columns respectively representing a first attribute
SC1-SC5 second columns respectively representing a second attribute
T1-T3 database tables
R1, R2 routines
202 program logic comprising routine R2
204 hierarchy of tables and database views
302 legacy database
304 legacy database
306 source tables
308 step
310 step
401 client device
402 legacy application
404 database server
406 source code of legacy application
602 with factoring module
604 log
L606 log entry for DB query
L608 log entry for parameter value calculation
606 source code section with query to a legacy database
608 source code section for calculating a parameter value
610 replacement code for code section 606
612 replacement code for code section 608
702-722 steps

The invention claimed is:

1. A data retrieval method for improving operation of a networked telecommunication system to provide efficient data retrieval via a telecommunication network, the network interoperatively coupling a mobile telecommunication device with a sender device, the sender device hosting an application and being interoperably coupled via the telecommunication network to a database server comprising a storage device containing a source database and a database management system hosting the source database, the method comprising:

supplementing the source database with multiple database views respectively representing a data model and at least one table prior to receiving, by the sender device, a data retrieval request from the application, wherein each database view is configured for retrieving instances of the data model represented by said database view from the at least one table of the source database upon being called, wherein each of the multiple database views comprises a first column and a second column, the first column representing a first attribute of the data model represented by said database view, the second column representing a second attribute of the data model represented by said database view, wherein each database view has assigned a routine for dynamically calculating second attribute values for the second attribute represented by said second column, wherein supplementing the source database with the at least one table comprises transferring first attribute values for the first attribute represented by the first column of each database view from a source column in the source database to a target column in the at least one table, wherein the at least one table is stored in the database server, and
wherein second attribute values are not stored in the database server, either in the source database or in the at least one table supplementing the source database;
providing an adapter module hosted by the sender device;
transmitting the data retrieval request from the sender device towards the database management system;
receiving, by the adapter module, the data retrieval request from the application from the sender device, by the receiving the data retrieval request, the first column of each of the multiple database views has already assigned first attribute values for the first attribute represented by said first column and each second column has assigned a routine for dynamically calculating second attribute values for the second attribute represented by said second column;
evaluating, by the adapter module, the data retrieval request for identifying at least one of the multiple database views that is capable of retrieving, upon being called, data specified in the data retrieval request;
calling, by the adapter module, the identified at least one database view with a single SQL query, to retrieve from the at least one table, instances of the data model represented by the identified at least one database view, the instances being retrieved via the telecommunication network, the single SQL query comprising a first select criterion directed at the first column of said at least one identified database view and a second select criterion directed at the second column of said at least one identified database view, wherein retrieving of the data model instances comprises calculating the second attribute values selectively for data model instances having been dynamically identified by means of the first select criterion, wherein the second attribute values are calculated dynamically for the identified data model instances;
forwarding, by the adapter module, the retrieved instances to the application;
processing, by the application, the forwarded instances of the data model; and
returning a result of said processing to the mobile telecommunication device via the telecommunication network.

2. The data retrieval method of claim 1, wherein retrieving of the data model instances is performed by the database management system by
evaluating the first select criterion on the first attribute values assigned to the first column of the at least one identified database view for selecting a first set of the instances of the data model represented by the at least one identified database view;
calculating the second attribute values selectively for the instances of the first set of the instances by executing the routine assigned to the second column at which the second select criterion is directed;
selecting a resulting set of instances of the data model represented by the at least one identified database view by evaluating the second select criterion selectively on the calculated second attribute values; and
returning the resulting set to the adapter module via the telecommunication network.

3. The data retrieval method of claim 1,
wherein the received request comprises pagination information, the pagination information being indicative of a start position and an offset of a list of the instances of the data model represented by the at least one identified database view;
wherein the generation of the single SQL query comprises transforming the pagination information into an OFFSET and a LIMIT SQL clause and including the OFFSET and LIMIT clause in the single SQL query; and
wherein the identification of the instances by means of the first and second select criteria comprises selectively selecting data model instances having a position, within a complete result set of instances matching the first and second select criteria, that is larger than a position specified in the OFFSET clause and smaller than a position specified in the LIMIT clause.

4. The data retrieval method of claim 3, further comprising:
dynamically specifying, by the mobile telecommunication device, a number of requested data model instances to be displayed on a single page via a display of the mobile telecommunication device by:
evaluating a network bandwidth of the telecommunication network connecting the mobile telecommunication device with the sender device, wherein the higher the network bandwidth, the higher the specified number of the instances;
including, by the mobile telecommunication device, the specified number of instances to be displayed as part of the pagination information in the request, wherein said specified number is to be transformed into the LIMIT clause.

5. The data retrieval method of claim 1, wherein the method further comprises:
immediately upon having forwarded the retrieved and processed data model instances by the application, freeing, by the sender device, storage space having been occupied by the retrieved and processed data model instances.

6. The data retrieval method of claim 1, further comprising:
receiving, by the application, the data retrieval request from the mobile telecommunication device and forwarding the data retrieval request to the adapter module;
wherein the receiving of the data retrieval request by the adapter module is implemented as receiving the forwarded data retrieval request from the application.

7. The data retrieval method of claim 1, wherein the first attribute values of the first attribute of one of the data models are originally stored in a source column of a table of a source database, wherein the supplementing of the source database with the multiple database views comprises mapping a column name of said source column to the first columns that represents said first attribute, the method further comprising:
automatically transferring the first attribute values from the source column to a target column contained in the at least one table;
automatically assigning the target column having received the transferred first attribute values to the first column that is assigned by the mapping to the source column originally comprising said first attribute values, to automatically create the assignment of the first column to the first attribute values and automatically linking the first attribute represented by said first column to the transferred first attribute values.

8. The data retrieval method of claim 1,
wherein the at least one table is one of a plurality of tables of the source database, wherein each of the multiple database views respectively representing a data model is a root element of a hierarchy of interconnected elements, wherein elements of the hierarchy include at least one further database views and at least one of the plurality of tables, said at least one further database view and said at least one table being interconnected to each other via primary and secondary database keys, such that a topology of the hierarchy and columns of the interconnected at least one database view and the at least one table determines how the instances of the data model represented by said database view being the root element of said hierarchy are retrieved.

9. The data retrieval method of claim 1, wherein each first column of each of the multiple database views respectively representing a data model is assigned via a mapping to a respective column of the at least one table of the source database; and
wherein at least a first routines assigned to one of the second columns of the multiple database views is an SQL statement and wherein at least a second routines assigned to another one of the second columns is part of a database-external program logic.

10. The data retrieval method of claim 1, wherein the first attribute values represented by the first column of the at least one identified database view is of a TEXT data type and wherein the first select criterion comprises a search phrase; and
wherein evaluating the first select criterion on the first attribute values comprises evaluating the search phrase on the first attribute value by performing a text search and including only those data model instances in the first set having first attribute values that match the search phrase.

11. The data retrieval method of claim 1, further comprising executing a refactoring module, said execution comprising:
analyzing, by the refactoring module, a log of a legacy application and analyzing, by the refactoring module, source code of the legacy application,
using, by the refactoring module, the result of said analyses for automatically replacing at least one legacy code section of the legacy application by a new code section, to create the application,
wherein the at least one replaced legacy code sections comprises data retrieval statements acting directly on tables of a legacy database for retrieving the first attribute values; and wherein the new code section comprises a specification of a call to the adapter module for triggering the adapter module to create the single SQL query, the single SQL query being configured for retrieving at least one of said first attribute values by calling one of the multiple database views that comprises a first column having assigned said first attribute values.

12. The data retrieval method of claim 11, wherein the legacy database comprises the first attribute values in at least one source table and lacks the multiple database views, wherein legacy SQL queries contained in the log comprise column names of columns of the at least one source table;
wherein the using of the result of the log analysis for automatically replacing the at least one legacy code section comprises:
selecting, by the refactoring module, one of the column names comprised in the log;
identifying, by the refactoring module, at least one legacy code section which directly accesses one of the columns of the at least one source table of the legacy database via said selected column name; and
evaluating, by the refactoring module, a mapping, the mapping comprising an assignment of the column names contained in the log with the first attributes of the data models, the evaluation being executed for identifying one of the first attributes mapped to the selected column name;
wherein the new code section is configured to call the adapter module for causing the adapter module to generate a single SQL query configured to call the one of the database views that represents the data model comprising the first attribute having been identified by evaluating the mapping.

13. The data retrieval method of claim 11, wherein the log is descriptive of legacy procedures of the legacy application, the legacy procedures having been executed for calculating parameter values of multiple parameters contained in the log, the parameter values being absent from the legacy database, the method further comprising:
selecting, by the refactoring module, one of the multiple parameters comprised in the log;
identifying, by the refactoring module, at least one further legacy code section being configured to calculate parameter values for said selected parameter;
evaluating, by the refactoring module, a further mapping, the further mapping comprising an assignment of the multiple parameters and the second attributes of the data models, said evaluation being executed for identifying one of the second attributes mapped to the selected parameter; and
using of the result of the log analysis for automatically replacing the at least one further identified legacy code section with a further new code section, wherein the further new code section comprises a specification of a call to the adapter module for causing the adapter module to generate a single SQL query configured to call the one of the multiple database views that represents the data model comprising the identified second attribute.

14. A method for improving operation of a networked telecommunication system to provide efficient data retrieval via a telecommunication network, the method being implemented by an adapter module, the adapter module being operatively coupled via the telecommunication network to a mobile telecommunication device and to a database management system hosting a database, the adapter module being interoperable with an application hosted by a sender device, the database comprising a source database, at least one table and multiple database views respectively representing a data model, wherein each database view is configured for retrieving instances of the data model represented from the at least one table of the database upon being called, wherein each of the multiple database views comprises a first column and a second column, the first column representing a first attribute of the data model represented by said database view, the second column representing a second attribute of the data model represented by said database view, where the least one table comprises first attribute values for the first attribute represented by the first column of each database view, the first attribute values transferred from a source column in the source database to a target column in the at least one table, and wherein second attribute values are not stored in the database, either in the source database or in the at least one table, the method comprising:

transmitting the data retrieval request from the sender device towards the database management system;

receiving, by the adapter module, a data retrieval request from the application to the database management system, by the receiving the data retrieval request, the first column of each of the multiple database views has already assigned first attribute values for the first attribute represented by said first column and each second column has assigned a routine for dynamically calculating second attribute values for the second attribute represented by said second column;

evaluating, by the adapter module, the data retrieval request for identifying at least one of the multiple database views that is capable of retrieving, upon being called, data specified in the data retrieval request;

calling, by the adapter module, the identified at least one database view with a single SQL query, to retrieve instances of the data model represented by the identified at least one database view, the instances being retrieved via the telecommunication network, the single SQL query comprising a first select criterion directed at the first column of said at least one identified database view and a second select criterion directed at the second column of said at least one identified database view, wherein retrieving of the data model instances comprises calculating the second attribute values selectively for data model instances having been dynamically identified by means of the first select criterion; and forwarding, by the adapter module, the retrieved instances to the application.

15. A networked telecommunication system for efficient data retrieval via a telecommunication network, the system comprising:

a sender device hosting an application;

a database server comprising a storage device containing a source database and a database management system hosting a database; and an adapter module, the adapter module being interoperably coupled with the database server and being interoperatively coupled with a mobile telecommunication device via the telecommunication network, wherein the database comprises multiple database views respectively representing a data model and at least one table, wherein each database view is configured for retrieving instances of the data model represented by said database view from the at least one table of the database upon being called, wherein each of the multiple database views comprises a first column and a second column, the first column representing a first attribute of the data model represented by said database view, the second column representing a second attribute of the data model represented by said database view and wherein the least one table comprises first attribute values for the first attribute represented by the first column of each database view, the first attribute values transferred from a source column in the source database to a target column in the at least one table, and wherein second attribute values are not stored in the database, either in the source database or in the at least one table, and wherein the adapter module is configured for:

receiving a data retrieval request sent from the application towards the database management system, by the receiving the data retrieval request, the first column of each of the multiple database views has already assigned first attribute values for the first attribute represented by said first column and each second column has assigned a routine for dynamically calculating second attribute values for the second attribute represented by said second column;

evaluating the data retrieval request for identifying at least one of the multiple database views that is capable of retrieving, upon being called, data specified in the data retrieval request;

calling the identified at least one database view with a single SQL query, to retrieve instances of the data model represented by the identified at least one database view, the instances being retrieved via the telecommunication network, the single SQL query comprising a first select criterion directed at the first column of said at least one identified database view and a second select criterion directed at the second column of said at least one identified database view, wherein retrieving of the data model instances comprises calculating the second attribute values selectively for data model instances having been dynamically identified by means of the first select criterion; and forwarding the retrieved instances to the application for enabling the application to process the forwarded instances and to return a result of said processing to the mobile telecommunication device via the telecommunication network.

* * * * *